United States Patent
Gonzalez Blazquez et al.

(10) Patent No.: US 7,764,781 B2
(45) Date of Patent: Jul. 27, 2010

(54) DSX MODULE WITH PERFORMANCE MONITORING

(75) Inventors: Jose Luis Gonzalez Blazquez, Madrid (ES); Dominic J Louwagie, Eden Prairie, MN (US); James D. Dewey, Plymouth, MN (US); Scott K. Baker, Richfied, MN (US); Duane R. Sand, Brooklyn Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1609 days.

(21) Appl. No.: 10/895,246

(22) Filed: Jul. 19, 2004

(65) Prior Publication Data

US 2006/0012968 A1  Jan. 19, 2006

(51) Int. Cl.
  *H04M 3/00* (2006.01)
  *H04M 5/00* (2006.01)
(52) U.S. Cl. .................................. 379/291
(58) Field of Classification Search ............. 379/291
  See application file for complete search history.

(56) References Cited

U.S. PATENT DOCUMENTS

| | | | |
|---|---|---|---|
| 4,840,568 A | 6/1989 | Burroughs et al. |
| 4,945,559 A | 7/1990 | Collins et al. |
| 4,949,376 A | 8/1990 | Nieves et al. |
| 5,359,654 A | 10/1994 | Jensen et al. |
| 5,363,440 A | 11/1994 | Daoud |
| 5,685,741 A | 11/1997 | Dewey et al. |
| 5,938,478 A | 8/1999 | Werner |
| 6,038,766 A | 3/2000 | Werner |
| 6,116,961 A * | 9/2000 | Henneberger et al. ....... 439/668 |
| 6,356,697 B1 | 3/2002 | Braga et al. |
| 6,422,902 B1 | 7/2002 | Ogren et al. |
| 6,619,993 B2 | 9/2003 | Jayne et al. |
| 6,621,975 B2 | 9/2003 | Laporte et al. |
| 6,626,705 B2 | 9/2003 | Perrone et al. |
| 2003/0022543 A1 | 1/2003 | Ogren et al. |
| 2004/0026105 A1* | 2/2004 | Mendoza ..................... 174/50 |

FOREIGN PATENT DOCUMENTS

| | | |
|---|---|---|
| EP | 0 795 935 A2 | 9/1997 |
| EP | 1 021 050 A1 | 7/2000 |
| WO | WO 96/38884 | 12/1996 |

OTHER PUBLICATIONS

Two sheets of drawings showing ADC's Monitor Panel, 64CKT Installation (Jul. 18, 2001).

(Continued)

*Primary Examiner*—Alexander Jamal
(74) *Attorney, Agent, or Firm*—Merchant & Gould P.C.

(57) ABSTRACT

A DSX system having a plurality of jacks mounted in a chassis, the jacks including IN and OUT ports accessible from the front of the chassis and tip and ring springs corresponding to each of the IN and OUT ports. The chassis also includes IN and OUT co-axial cable connectors electrically connected to the tip and ring springs of the jacks, and MONITOR co-axial cable connectors for use in monitoring signals transmitted through the IN and OUT connectors.

23 Claims, 11 Drawing Sheets

OTHER PUBLICATIONS

Four sheets of drawings showing ADC's W/W Chassis Assembly Installation (Aug. 22, 2000).

"64-CKT DSI/Flex Module All Front Access with I/O Monitor", *ADC*, Catalog No. DFX-1FA064, 2 pages (Mar. 27, 2000).

"Assembly, Chassis Wire Wrap, Flex-X", *ADC*, Catalog No. DFX-1FA064, 4 pages (May 18, 2000).

"DSX1 New Products, Monitor Panels," ADC, 2 pages (Date Unknown).

"E1 64 Circuit Panel. Telect Part No. E64-5000-1100", http://www.telect.com/index.cfm?, Telect, 3 pages (Jun. 13, 2001).

"E1 64 Circuit Panel. Telect Part No. E64-5000-1200", http://www.telect.com/index.cfm?, Telect, 3 pages (Jun. 13, 2001).

"RJ45 Chassis Assembly Installation Drawing", *ADC*, Catalog No. DFX-120001, 2 pages (Sep. 28, 2000).

\* cited by examiner

DSX MODULE WITH PERFORMANCE MONITORING

TECHNICAL FIELD

The principles disclosed herein relate generally to telecommunications equipment. More particularly, the disclosure relates to systems for monitoring digital equipment.

BACKGROUND

A digital cross-connect system (DSX) provides a location for interconnecting two digital transmission paths. The apparatus for a DSX is located in one or more frames, or bays, usually in a telephone service provider's central office. The DSX apparatus also provides jack access to the transmission paths.

DSX jack inserts are well known and typically include a plurality of bores sized for receiving plugs. A plurality of switches are provided adjacent the bores for contacting the plugs. The jack inserts are electrically connected to digital transmission lines, and are also electrically connected to a plurality of termination members used to cross-connect the jack inserts. By inserting plugs within the bores of the jack inserts, signals transmitted through the jack inserts can be interrupted or monitored.

Figure 1:
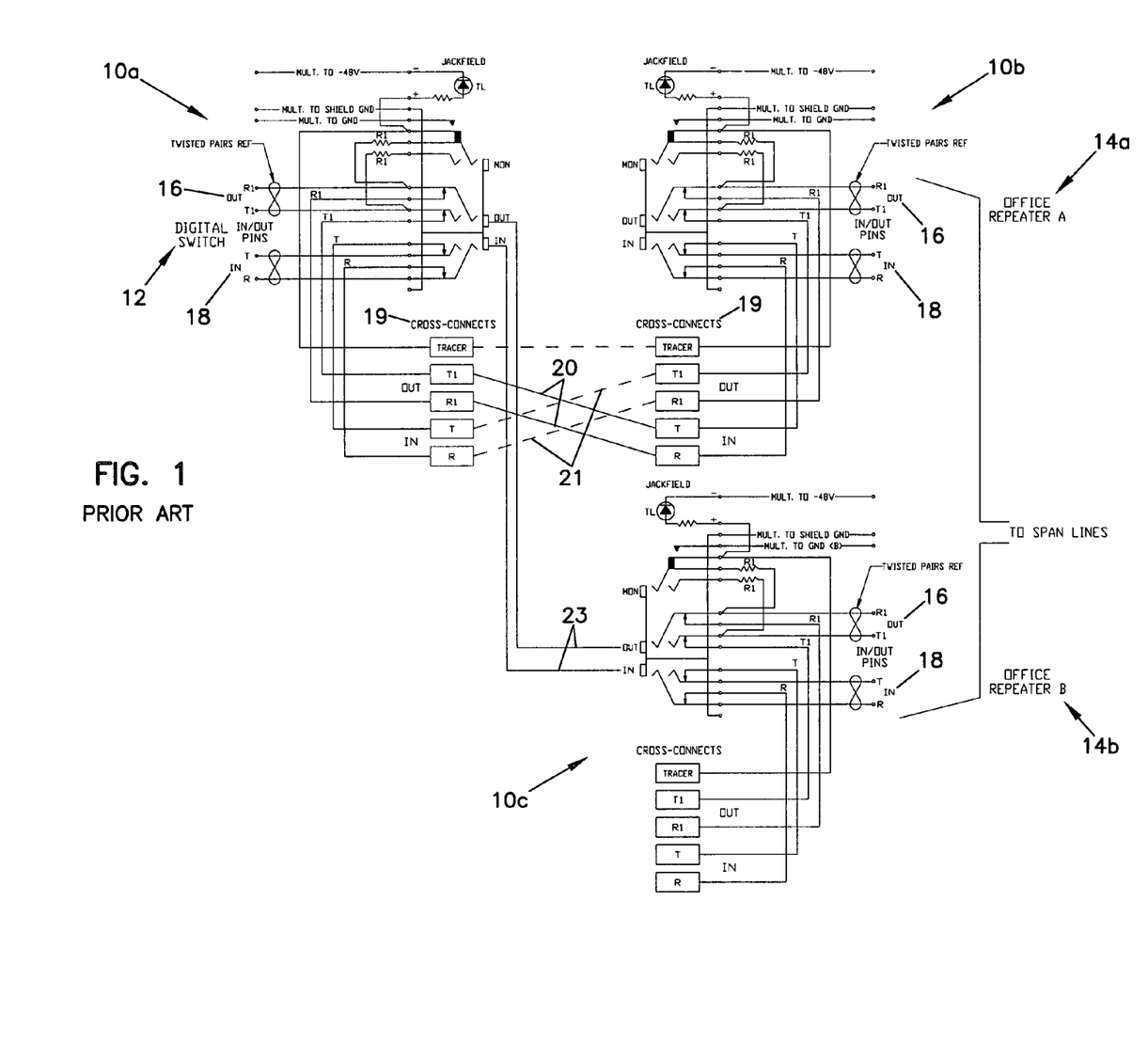
FIG. 1 is a schematic diagram of a prior art DSX system.
Figure 2:
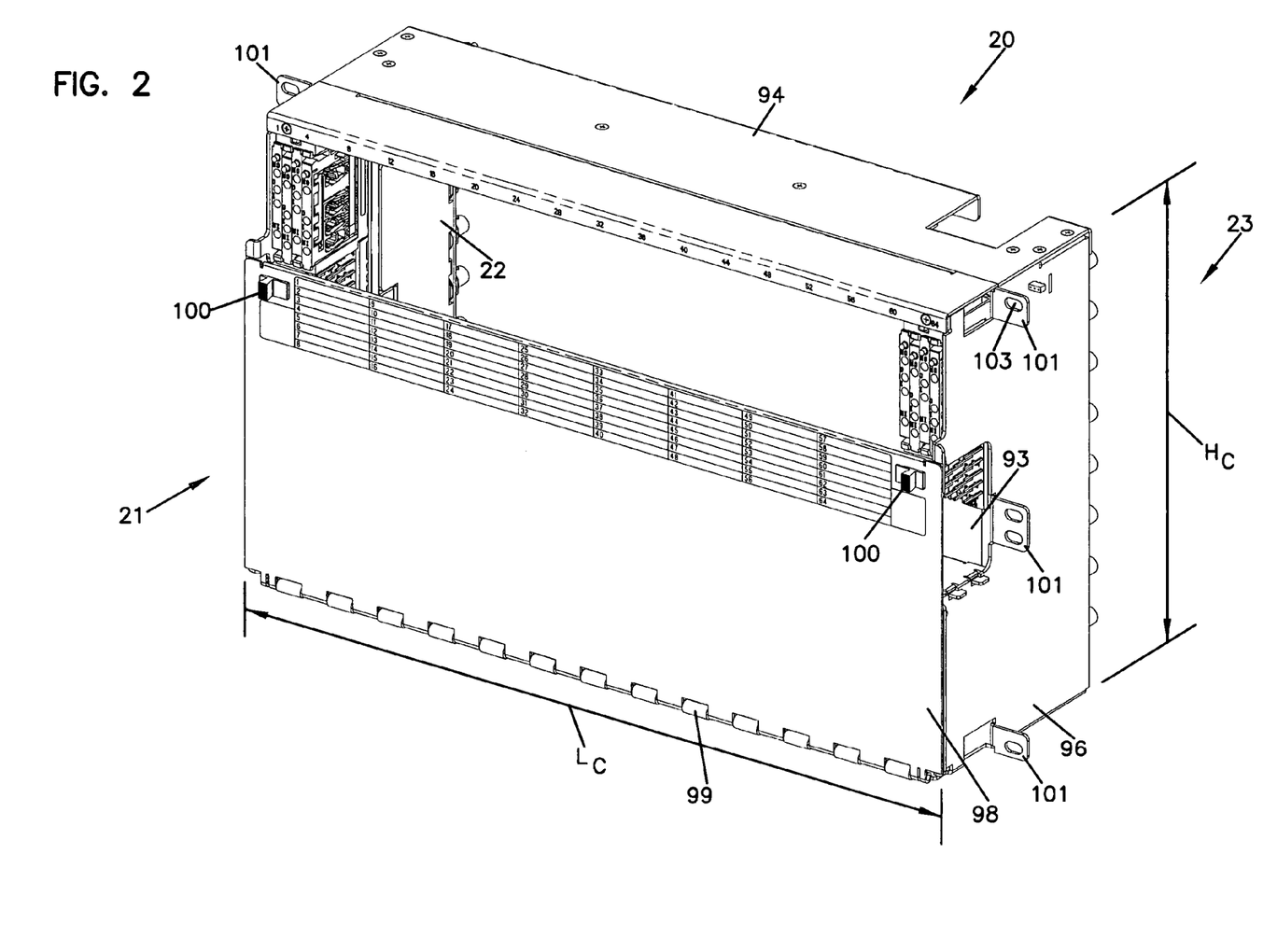
FIG. 2 is a front, perspective view of a chassis having features that are examples of inventive aspects in accordance with the principles of the present disclosure.

FIG. 1 schematically illustrates a DSX system that is an example of the type found at a telephone service provider's central office. The DSX system is shown including three DSX jack inserts 10a, 10b and 10c. Each DSX jack insert 10a, 10b and 10c is connected to a specific piece of digital equipment. For example, jack insert 10a is shown connected to digital switch 12, jack insert 10b is shown connected to office repeater 14a, and jack insert 10c is shown connected to office repeater 14b. Each piece of digital equipment has a point at which a digital signal can enter, as well as a point at which the digital signal can exit. The jack inserts 10a, 10b and 10c each include OUT termination pins 16 and IN termination pins 18. The DSX jack inserts 10a, 10b and 10c are connected to their corresponding pieces of digital equipment by connecting the OUT termination pins 16 to the signals exiting the equipment (i.e., going toward the DSX system) and the IN termination pins 18 to the signals entering the equipment (i.e., going away from the DSX system).

Referring still to FIG. 1, jack inserts 10a and 10b are "cross-connected" to one another by semi-permanent connections. A "semi-permanent" connection is a connection that is more permanent than the connections provided by typical patch cords equipped with tip-and-ring plugs. Example semi-permanent connectors include co-axial connectors, wire wrap connectors, RJ-45 type connectors and insulation displacement connectors. The semi-permanent connections extend between cross-connect fields 19 of the jacks inserts 10a and 10b. For example, wires 20 connect OUT cross-connect pins of jack insert 10a to IN cross-connect pins of jack insert 10b. Similarly, wires 21 connect IN cross-connect pins of jack insert 10a to OUT cross-connect pins of jack insert 10b. The jack inserts 10a and 10b are preferably normally closed. Thus, in the absence of a plug inserted within either of the jack inserts 10a and 10b, an interconnection is provided through the jack inserts 10a and 10b and between digital switch 12 and office repeater 14a.

The semi-permanent connection between the digital switch 12 and the office repeater 14a can be interrupted for diagnostic purposes by inserting patch cord plugs within the IN or OUT ports of the jack inserts 10a and 10b. Likewise, patch cords can be used to interrupt the semi-permanent connection between the jack inserts 10a and 10b to provide connections with other pieces of digital equipment. For example, the digital switch 12 can be disconnected from the office repeater 14a and connected to the office repeater 14b through the use of patch cords 23. The patch cords 23 include plugs that are inserted within the IN and OUT ports of the jack 10a and the IN and OUT ports of the jack insert 10c. By inserting the plugs within the IN and OUT ports of the jack insert 10a, the normally closed contacts are opened, thereby breaking the electrical connection with the office repeater 14a and initiating an electrical connection with office repeater 14b.

An important consideration in a digital cross-connect system is circuit density. Other considerations include monitoring capabilities and options. In general, improvement with regards to these and other considerations is desired.

SUMMARY

One inventive aspect of the disclosure relates to a DSX system that includes co-axial cable connectors for enabling semi-permanent performance monitoring of digital equipment.

Another inventive aspect relates to a DSX module that carries IN and OUT co-axial cable connectors, and also carries MONITOR co-axial cable connectors for use in monitoring signals transferred through the IN and OUT connectors.

A further inventive aspect of the disclosure relates to a DSX system having a plurality of jacks mounted in a chassis, the jacks including IN and OUT ports accessible from the front of the chassis and tip and ring springs corresponding to each of the IN and OUT ports. The chassis also includes IN and OUT co-axial cable connectors electrically connected to the tip and ring springs of the jacks, and MONITOR co-axial cable connectors for use in monitoring signals transmitted through the IN and OUT connectors.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

Reference will now be made in detail to examples of inventive aspects of the present disclosure, which are illustrated, in the accompanying drawings. Wherever possible, the same reference numbers will be used throughout the drawings to refer to the same or like parts.

FIGS. 2-5 illustrate an embodiment of a chassis 20 for housing a plurality of removable jack modules 22 having features that are examples of inventive aspects in accordance with the principles of the present disclosure. For clarity, only two of the jack modules 22 are shown mounted in the chassis 20. However, it will be appreciated that the chassis 20 is adapted for housing a relatively large number of jack modules 22. For example, to conform with conventional international standards, the chassis 20 can house 16 jack modules 22 and have a length $L_C$ of about 19 inches. Alternatively, in accordance with standard United States specifications, the chassis could be configured to house 21 jack modules and have a length $L_C$ of about 23 inches. Of course, other sizes and other numbers of jack modules could also be used.

The chassis 20 includes a front side 21 positioned opposite from a rear side 23. The chassis 20 includes a top piece 94 positioned opposite from a bottom piece 95. The top and bottom pieces 94 and 95 are interconnected by left and right side walls 96 and 97.

A chassis door 98 is connected to the bottom piece adjacent the front side of the chassis. A hinge 99 allows the door 98 to pivot between a horizontal open and a vertical closed orientation. Latches 100 hold the door 98 in the vertical orientation. The chassis door 98 functions to protect the cross-connect contacts of a cross-connect panel. The sidewalls 96 and 97 define access openings 93 for allowing cables to be routed through the side walls when the door 98 is in a closed orientation.

In one embodiment, the chassis 20 has a height $H_C$ and is sized to span multiple rack units of a conventional telecommunications rack. In certain embodiments, the height $H_C$ can be about 10-12 inches or preferably about 10.5 inches.

Figure 4:
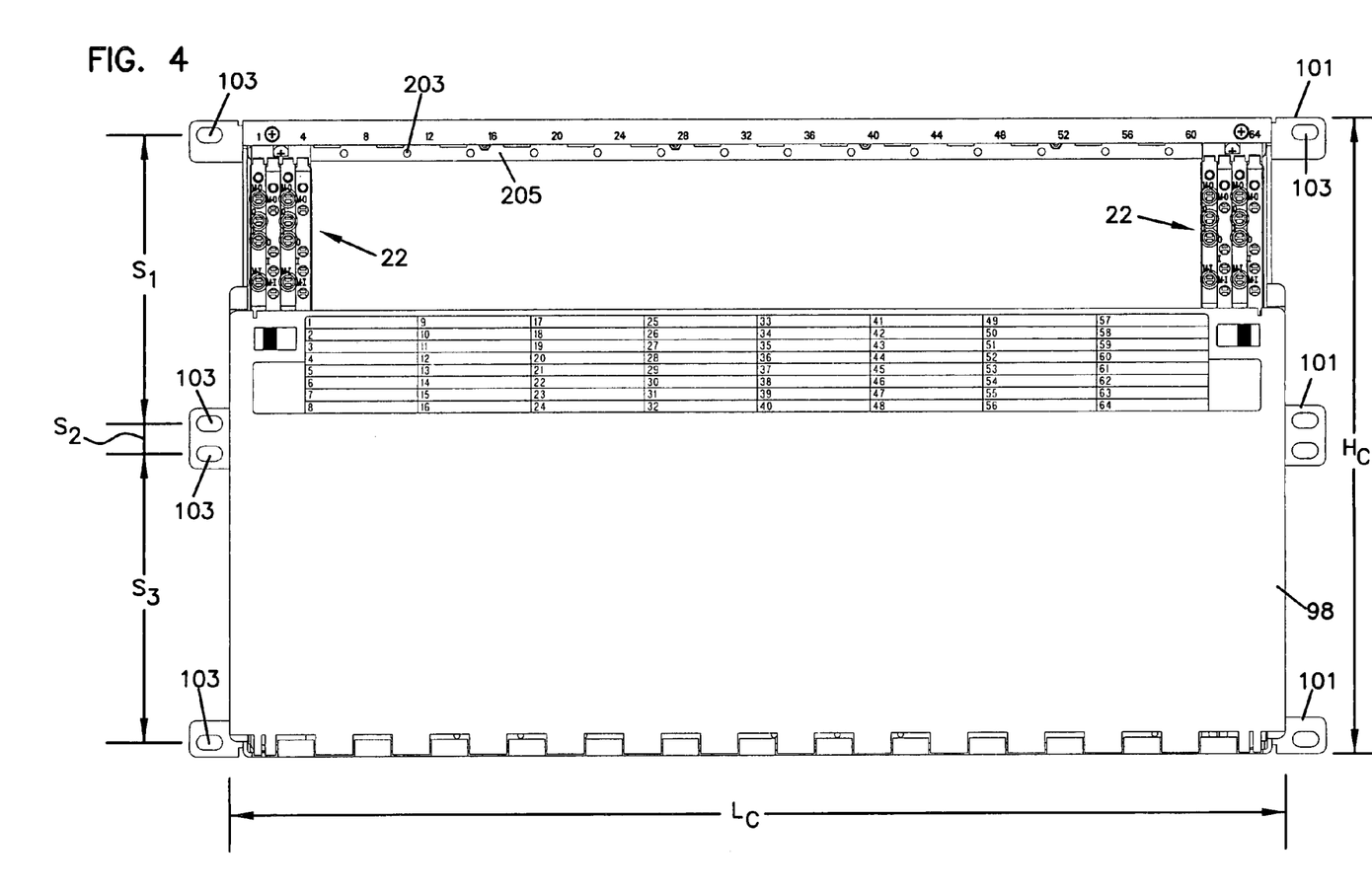
FIG. 4 is a front view of the chassis of FIGS. 2 and 3.
Figure 5:
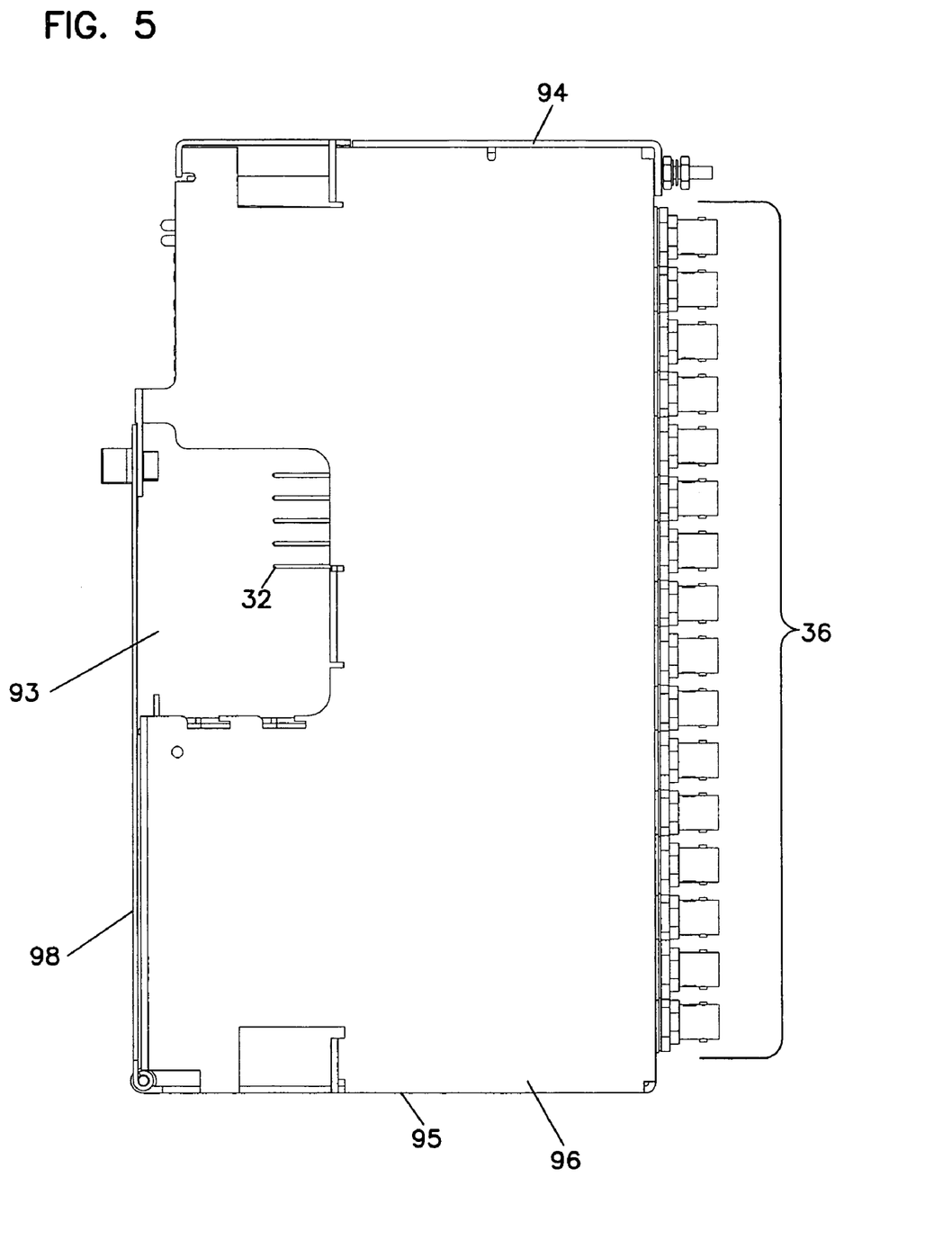
FIG. 5 is a left side view of the chassis of FIGS. 2-4.

Referring to FIG. 4, the chassis includes mounting flanges 101 projecting outwardly from the left and right side walls 96 and 97 for use in fastening the chassis to a conventional rack. The mounting flanges 101 include fastener openings 103 adapted to align with corresponding fastener opening defined by a conventional telecommunications rack. Fasteners such as bolts are inserted through the fastener openings for securing the chassis to the rack. The openings 103 are separated by vertical spacings $S_1$, $S_2$ and $S_3$. In one embodiment, each spacing $S_1$ and $S_3$ can be about 4.5 inches, and the spacing $S_2$ can be about 0.5 inches. In such an embodiment, the chassis preferably has a height less than or equal to 10.5 inches. The spacings are selected to be compatible with both EIA (Electronic Industries Alliance) and WECO rack hole spacings.

Figure 6:
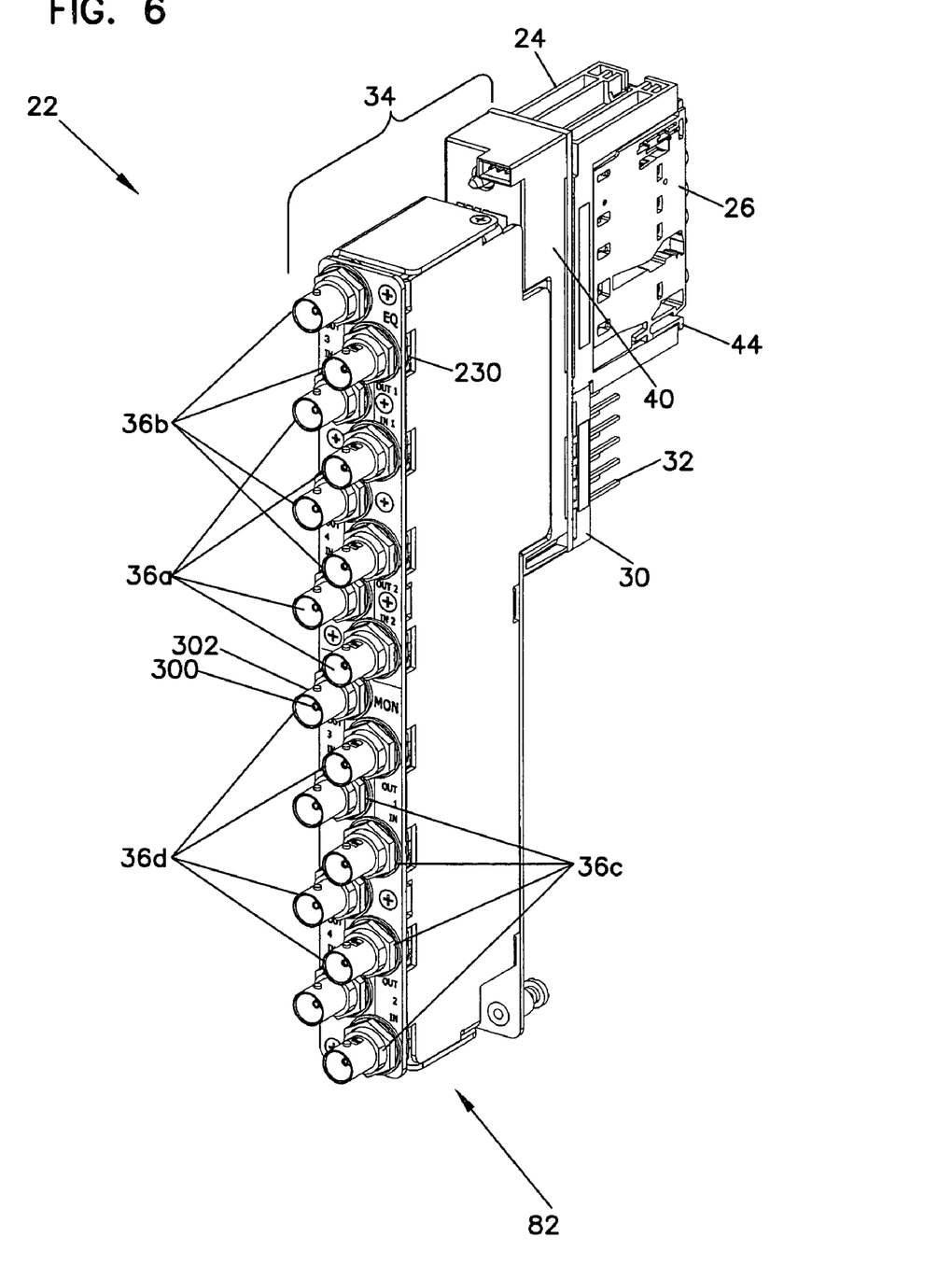
FIG. 6 is a rear perspective view of a jack module having features that are examples of inventive aspects in accordance with the principles of the present disclosure.
Figure 7:
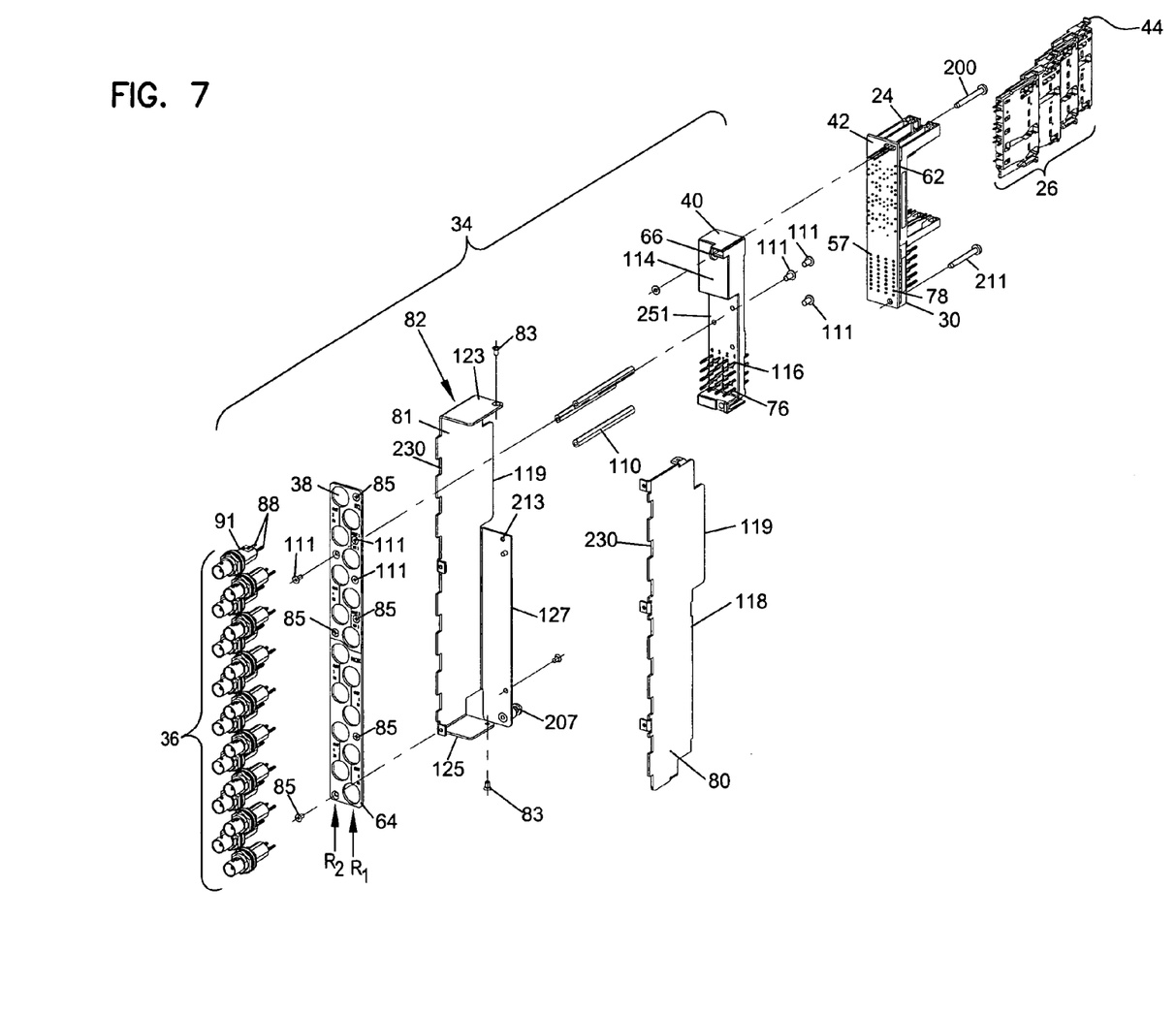
FIG. 7 is a rear, exploded view of the jack module of FIG. 6.

Referring now to FIGS. 6 and 7, one of the jack modules 22 is shown in isolation from the chassis. The jack module 22 includes a modular front mount 24 for holding a plurality of jack inserts 26 (i.e., jack assemblies or jack cards). As best shown schematically in FIG. 11, the jack inserts 26 each include an OUT jack 46, a MONITOR-OUT jack 47, an IN jack 48 and a MONITOR-IN jack 49. A cross connect block or panel 30 is mounted below the front mount 24. The cross-connect panel 30 includes a plurality of cross-connect contacts such as wire wrap pins 32 or other types of contacts/connectors (e.g., insulation displacement connectors) that are electrically connected to the OUT and IN jacks 46, 48 of the jack inserts 26 at least in part through a circuit board 42. The jack module 22 further includes a rear connector mount assembly 34 including a rear housing 82. The rear housing 82 includes a rear faceplate 64 to which rearwardly facing co-axial cable connectors 36 are mounted. The jack module 22 further includes an intermediate support 40 located between the rear housing 82 and the front mount 24. Wire wrap pins 76 project rearwardly from the support 40. The wire wrap pins 76 are electrically connected to OUT and IN jacks 46, 48 of the module 22 at least in part through the circuit board 42. Electrical leads 88 (shown schematically in FIG. 11) enclosed within the housing 82 electrically connect the wire wrap pins 76 to the co-axial cable connectors 36. The co-axial connectors 36 are shown including balun housings 91 that include baluns/transformers for converting signals between twisted pair and co-axial.

The jack inserts 26 of the jack module 22 are preferably removably mounted in the front mount 24. For example, the jack inserts 26 can be retained within the jack mount 24 by resilient latches 44. By flexing the latches 44, the jack inserts 26 can be manually removed from the front mount 24. When the jack inserts 26 are removed from the front mount 24, their corresponding jacks are electrically disconnected from the circuit board 42. While the jack module 22 is shown as a "four-pack" (i.e., a module including four jacks), it will be appreciated that alternative modules can include jack mounts sized to receive more or fewer than four jacks.

Figure 8:
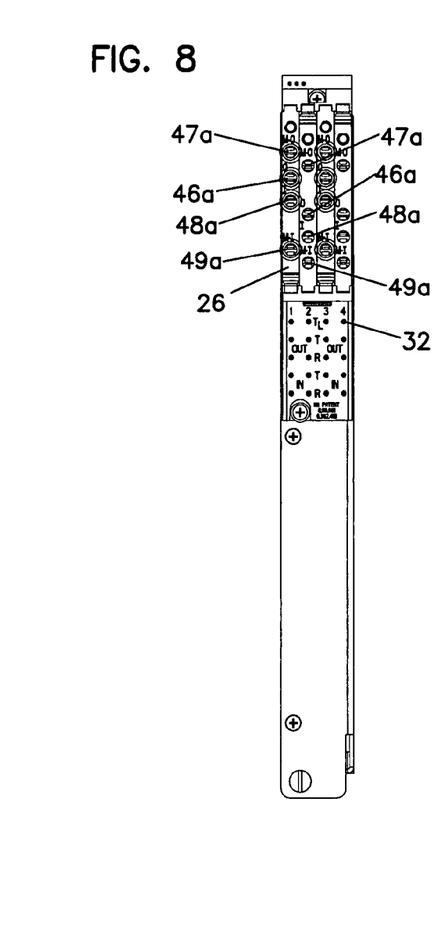
FIG. 8 is a front elevational view of the jack module of FIGS. 6 and 7.
Figure 9:
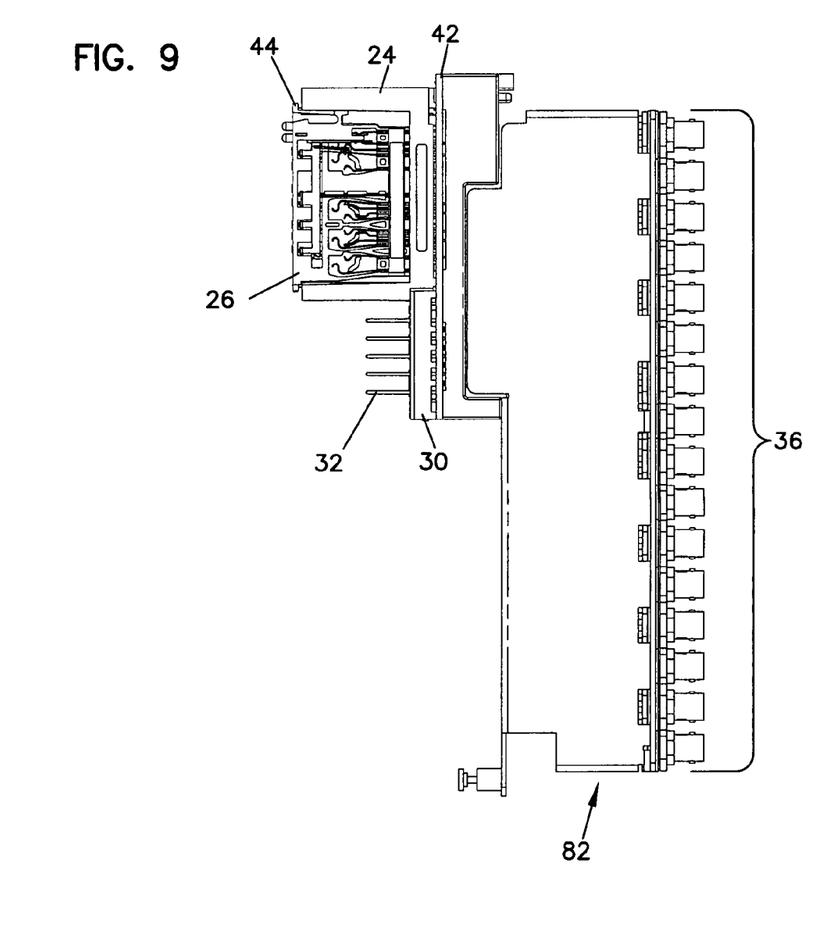
FIG. 9 is a left side view of the jack module of FIGS. 6 and 7.

As best shown in FIG. 8, each of the jack inserts 26 includes a front face defining an OUT port 46a corresponding to the OUT jack 46, a MONITOR-OUT port 47a corresponding to the MONITOR-OUT jack 47, an IN port 48a corresponding to the IN jack 48 and a MONITOR-IN port 49a corresponding to the MONITOR-IN jack 49. When mounted in the front mount 24, the ports 46a-49a of one jack insert 26 are vertically offset from the respective ports 46a-49a of the adjacent jack inserts 26.

Figure 11:
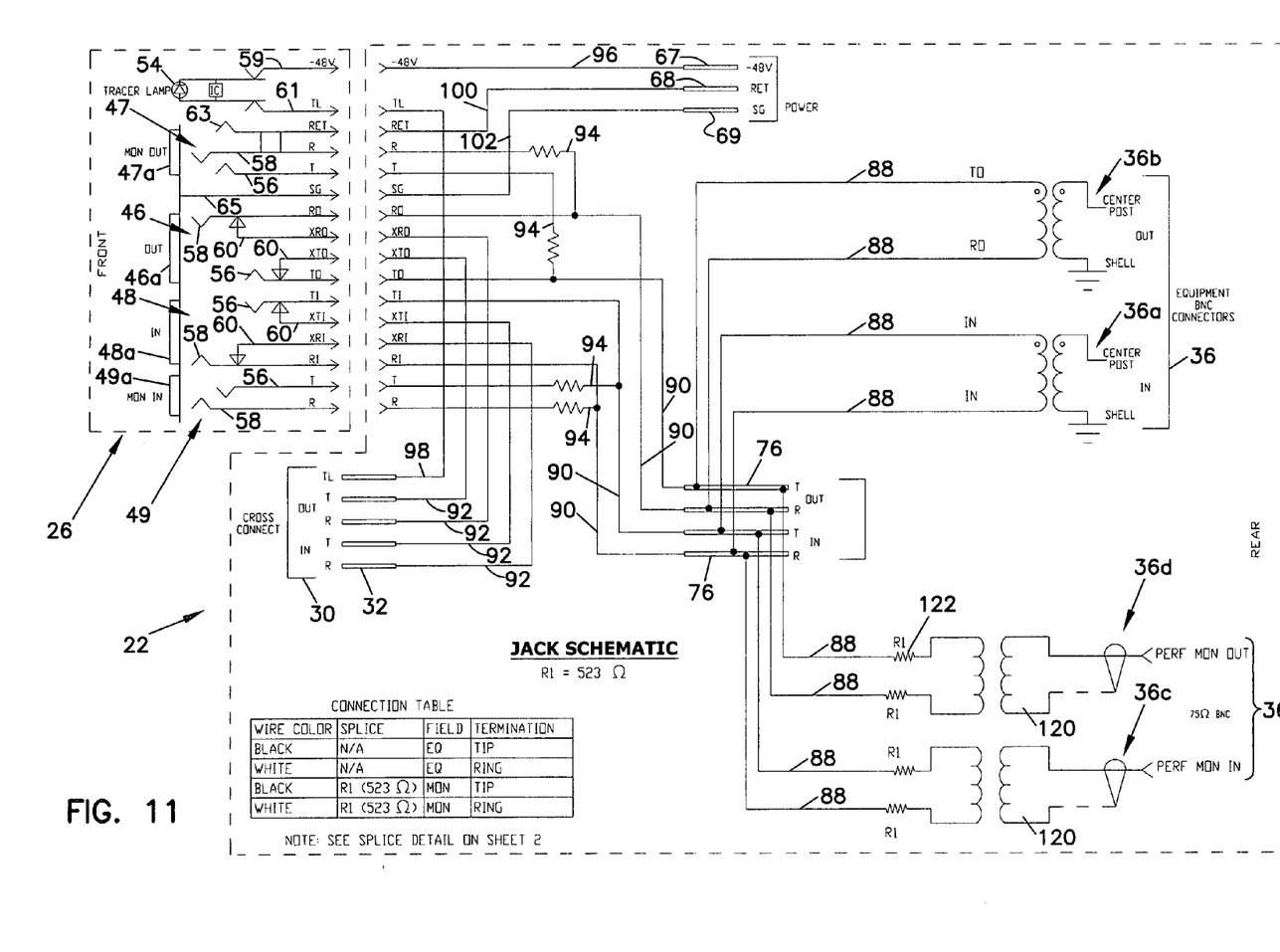
FIG. 11 is a circuit schematic for a jack insert of the jack module of FIGS. 6 and 7.

FIG. 11 schematically depicts representative DSX circuitry corresponding to one of the jack inserts 26 of the jack module 22. It will be appreciated that each of the jack inserts can include similar circuitry. Referring to FIG. 11, each of the jacks 46-49 includes tip and ring springs 56, 58 positioned behind the ports 46a-49a. The OUT and IN jacks 46, 48 also have normal springs 60 that correspond to the tip and ring springs 56, 58. The jack springs of the IN and OUT jacks 46, 48 are arranged in a conventional "normal-through" switching configuration. As such, the normal springs 60 normally engage their corresponding tip and ring springs 56, 58 when no plugs are present in the ports 46a, 48a. This allows signals to normally be transmitted through the jacks 46, 48 between the cross connect panel 30 and the rear co-axial cable connectors 36. By inserting a plug within either the IN port 46a or the OUT port 48a, the tip and ring springs 56, 58 corresponding to the port in which the plug is inserted are separated from their corresponding normal springs 60 thereby breaking the connection between the cross-connect panel 30 and the rear connectors 36 and providing signal access through the plug.

Each jack insert 26 also includes a tracer lamp circuit 54 electrically connected to a voltage spring 59 and a tracer lamp spring 61. The jack inserts 26 further include return ground springs 63 and sleeve ground contacts 65. Additional details about the jacks 26 can be found in commonly assigned U.S. Pat. No. 6,116,961 that is hereby incorporated by reference in its entirety.

Figure 12:
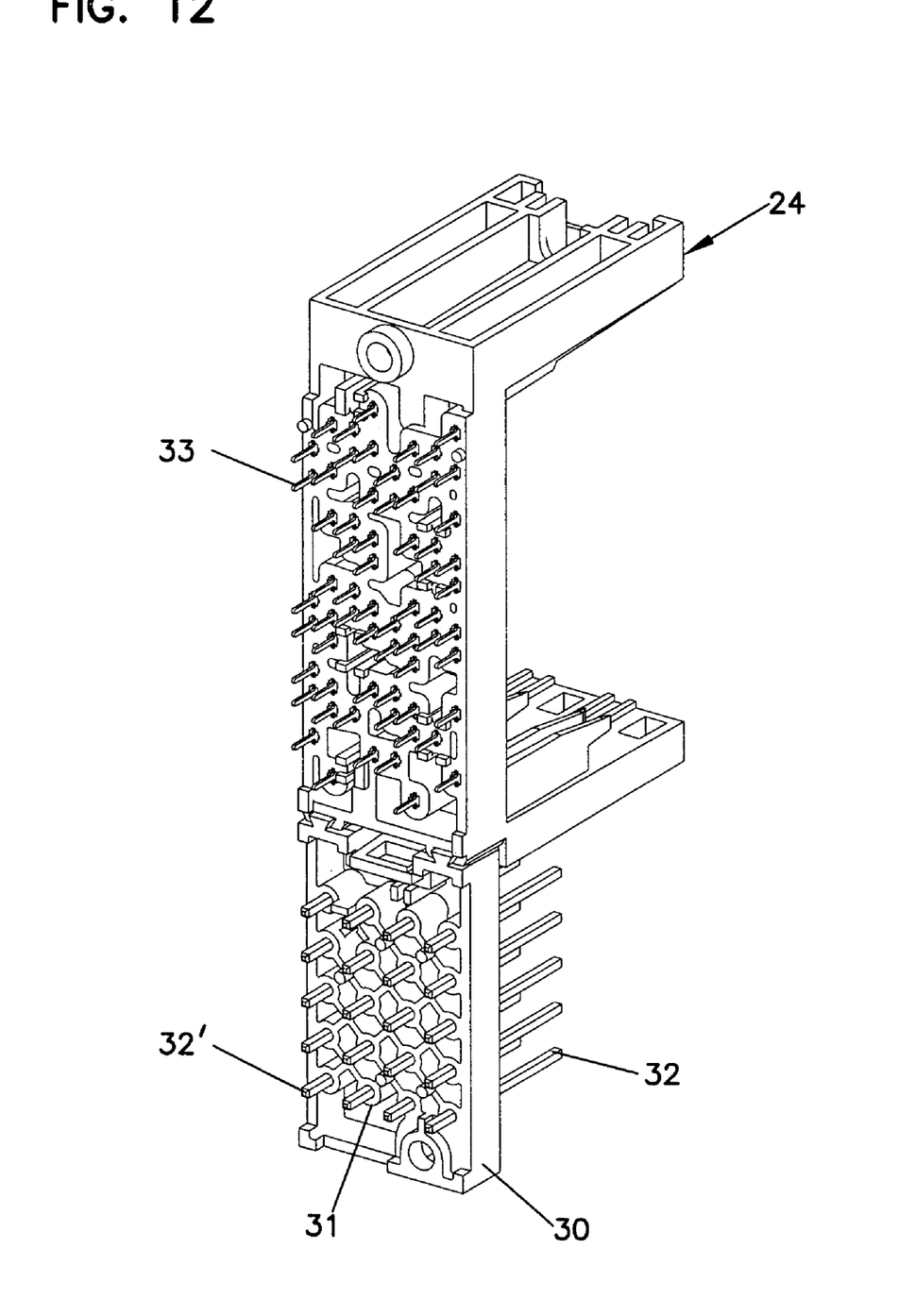
FIG. 12 is a rear perspective view of a jack mount of the jack module of FIGS. 6 and 7.

Referring to FIG. 12, the cross-connect panel 30 of the jack module 22 preferably includes openings 31 in which the wire wrap pins 32 are press fit. Rear ends 32' of the wire wrap pins 32 preferably project rearwardly through the cross-connect panel 30. Similarly, the front mount 24 preferably includes a plurality of contacts having pins 33 that project outwardly from the back side of the front mount 24. The contacts are adapted to provide electrical connections with the jack springs when the jack inserts 26 are inserted within the jack mount 24. Further details relating to the contacts of the front mount 24 can be found in U.S. Pat. No. 6,116,961, which was previously incorporated by reference.

Referring now to FIG. 7, the intermediate support 40 of the jack module 22 is generally rectangular and is preferably made of a dielectric material such as molded plastic. The support 40 includes a rear face 114 defining openings 116 in which the wire wrap pins 76 are press fit. The wire wrap pins 76 have portions that project both rearwardly and forwardly from the intermediate support 40. The forward ends of the wire wrap pins 76 are preferably press fit within plated through-holes 78 defined by a circuit board 42. This provides electrical connections between the wire wrap pins 76 and the circuit board 42, and also mechanically couples the rear support 40 to the circuit board 42. The jack mount 24 and the cross-connect panel 30 are preferably coupled to the circuit board 42 in a similar manner. For example, to electrically and mechanically couple the cross-connect panel 30 to the circuit board 42, the rear ends 32' of the wire wrap pins 32 are preferably press fit within corresponding plated through-holes 57 defined by the circuit board 42. To electrically and mechanically couple the jack mount 24 to the circuit board 42, the contact pins 33 (shown in FIG. 12, but not FIGS. 6-9) are press fit within corresponding plated through-holes 62 defined by the circuit board 42.

The support 40 further includes a plug receptacle 66 that projects outwardly from the rear face 114. The plug receptacle 66 is adapted to house power, return ground and sleeve ground contacts 67, 68 and 69 (shown in FIG. 11) that are electrically connected to the circuit board 42. The receptacle 66 is sized to receive a conventional power plug for providing power to the jack module 22 for use in illuminating the tracer lamp 54.

Referring again to FIG. 7, the rear faceplate 64 of the housing 82 is offset from the intermediate support 40 by posts 110. The ends of the posts 110 are secured to the support 40 and the rear faceplate 64 by fasteners 111. The rear housing 82 also includes a first side plate 80 and a second side plate 81. The first side plate 80 includes an integral top plate 123, bottom plate 125 and front plate 127. The first side plate 80 and the second side plate 81 are coupled together with fasteners 83, and coupled to the rear faceplate 64 with fasteners 85. The housing 82 functions to enclose and protect the wire wrap pins 76, the leads 88 and the front portions of the rear connectors 36.

Figure 3:
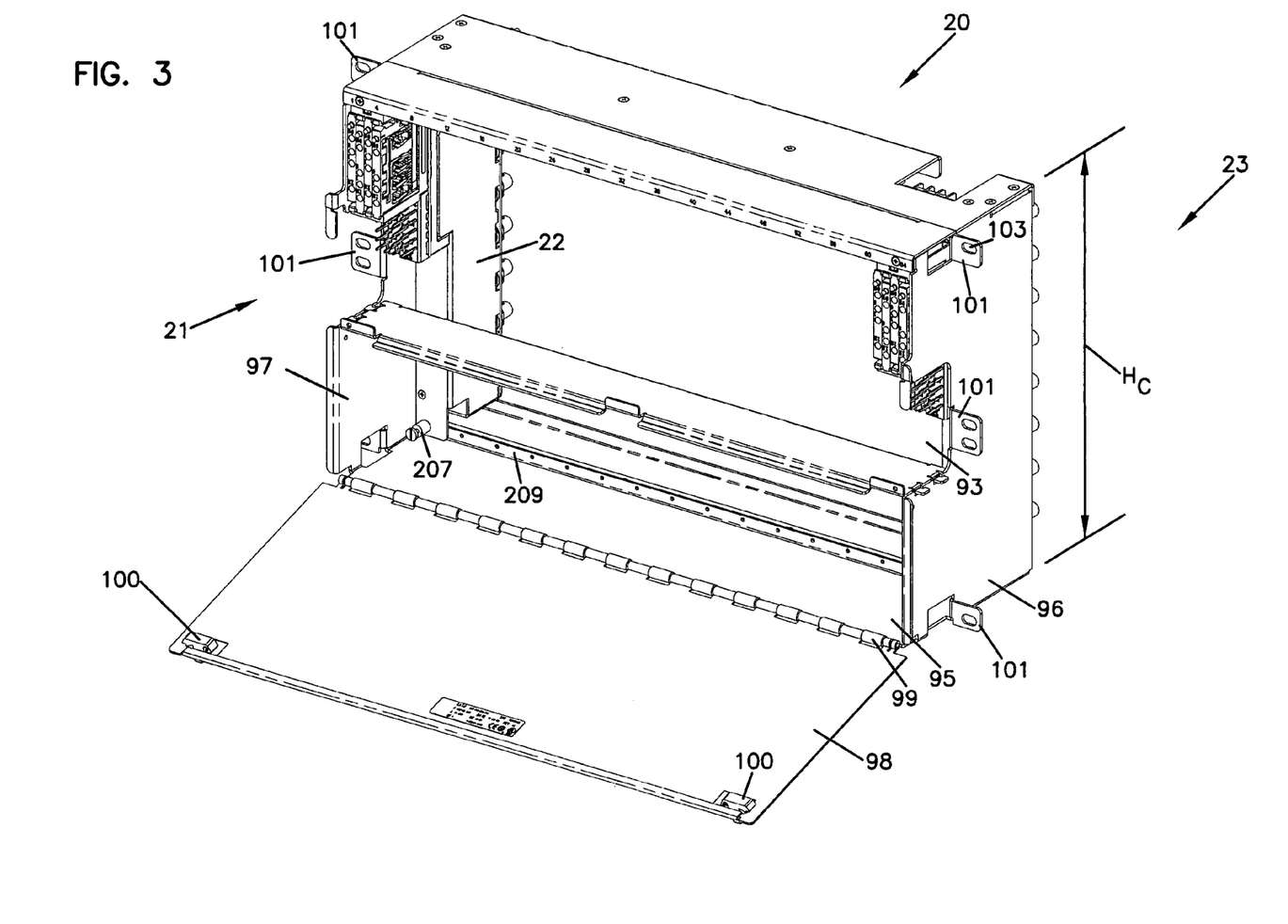
FIG. 3 is a front, perspective view of the chassis of FIG. 2, the chassis door is shown in an open position.

The front jack mount 24 is secured to the intermediate support 40 by a fastener 200. The fastener 200 also passes through openings 203 (shown in FIG. 4) defined by an upper flange 205 of the chassis 20 to fasten the module 22 within the chassis 20. The module 22 is also fastened to the chassis 20 by a lower fastener 207 provided adjacent the bottom edge of the front plate 127 of the rear housing 82. As shown in FIG. 3, the fastener 207 interconnects with a lower flange 209 of the chassis 20 to secure the module 22 within the chassis 20. The module 22 further includes a fastener 211 that couples the cross-connect block 30 to the rear housing 82. The fastener 211 extends through the cross-connect block 30 and the intermediate support 40, and engages an opening 213 defined adjacent the top end of the front plate 127 of the rear housing 82.

The faceplate 64 of the rear housing 82 defines openings 38 for mounting the rear connectors. The connectors 36 are arranged on the faceplate 64 in two vertical rows R1 and R2, with 8 connectors per row. The connectors 36 of the first row R1 are vertically staggered relative to the connectors 36 of the second row R2 to enhance the circuit density. For example, the connectors 36 of the first row R1 are positioned to generally align with vertical spacings between the connectors of the second row R2, and the connectors 36 of the second row R2 are positioned to align generally with vertical spacings between the connectors 36 of the first row R1. In one embodiment, the faceplate 64 has a height less than or equal to about 10.5 inches, and a width less than or equal to 1.25 inches; or more preferably, the width is less than or equal to 1.1 inches.

Referring still to FIG. 7, rear ends of the plates 80, 81 define notches 230 adapted to provide clearance for preventing the bodies of the connectors 36 from engaging the side plates 80, 81. The notches 230 defined by the plate 80 align with the connectors 36 of the first row R1 and the notches 230 defined by the second plate 81 align with the connectors 36 of the second row R2. Front ends of the plates 80, 81 define forward projections 119 adapted to enclose the side of a recessed region 251 defined by the intermediate support 40.

Figure 10:
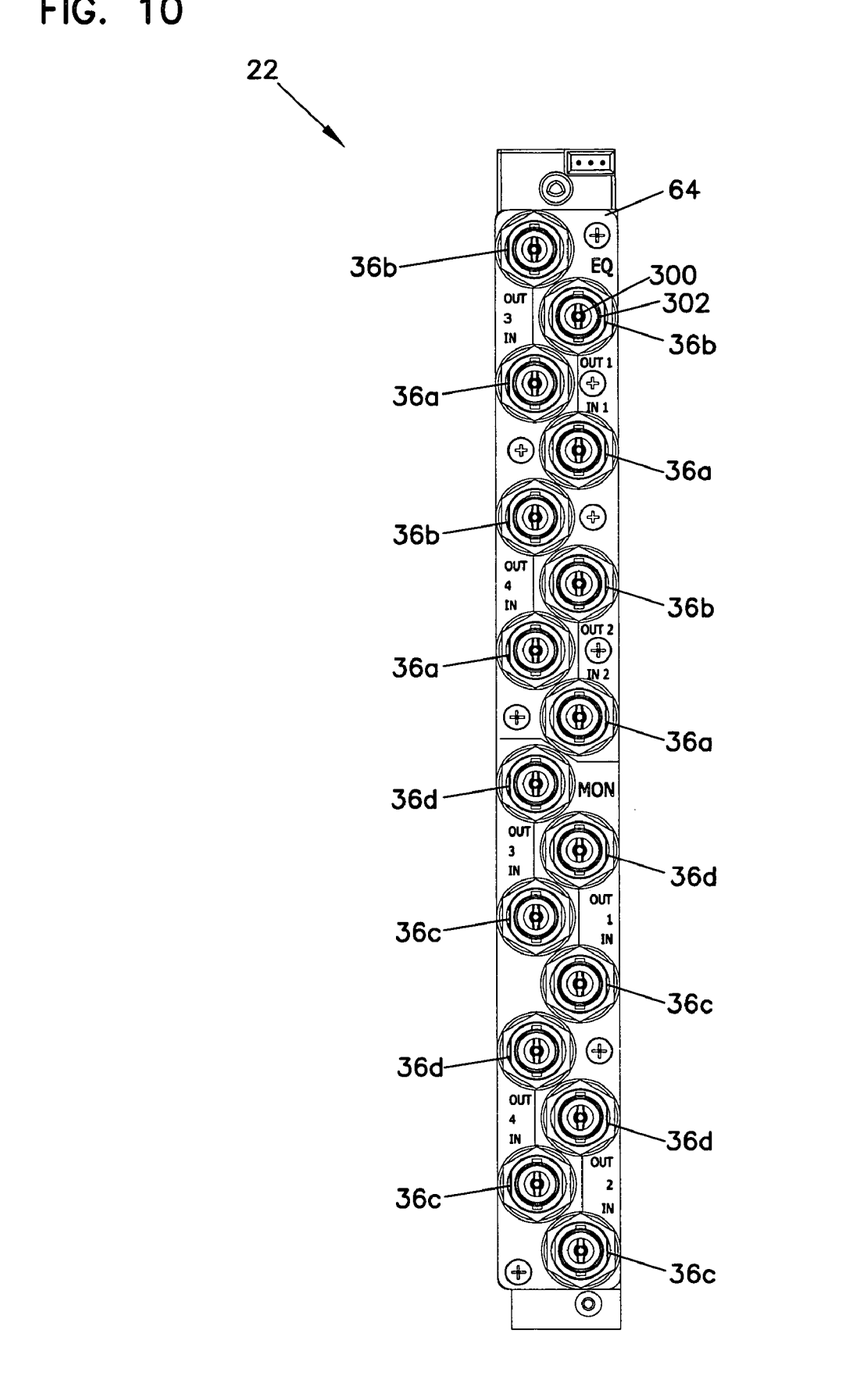
FIG. 10 is a rear elevational view of the jack module of FIGS. 6 and 7.

As shown in FIGS. 6, 7, and 10, the rear connectors 36 include sixteen co-axial cable connectors that fit within the openings 38. Four of the connectors are IN connectors 36a, four are OUT connectors 36b, four are MONITOR IN connectors 36c, and four are MONITOR OUT connectors 36d. As shown schematically in FIG. 11, leads 88 of the connectors 36 are electrically connected to corresponding wire wrap pins 76 that are press fit within the rear support 40. The connectors 36 are adapted to provide semi-permanent connections with digital equipment and test/monitoring equipment. While the connectors 36 have been shown as 75 ohm, co-axial BNC connectors, it will be appreciated that other types of co-axial cable connectors such as 1.6/5.6 connectors or SMB connectors; or other connectors, could also be used.

Referring now to FIG. 11, as illustrated schematically, the rear connectors 36 are electrically connected to the wire wrap pins 76 via the leads 88. Inductors 120 (e.g., baluns) are provided for converting signals from twisted pair (i.e. balanced signals) to co-axial signals (i.e., unbalanced). The wire wrap pins 76 are shown electrically connected to the tip and ring springs 56 and 58 of the OUT and IN jacks 46, 48 by tracings 90 of the circuit board 42. The circuit board 42 also includes tracings 92 that provide electrical connections between the wire wrap pins 32 of the cross connect panel 30 and the normal springs 60 of the OUT and IN jacks 46, 48. Additionally, the circuit board 42 includes tracings 94 for electrically connecting the tip and ring springs 56 and 58 of the MONITOR jacks 47, 49 to the tracings 90. Further, the circuit board 42 includes: tracing 96 for connecting voltage spring 59 to power contact 67; tracing 98 for connecting tracer lamp spring 61 to the cross-connect panel 30; tracing 100 for connecting return ground spring 63 to return ground contact 68; and tracing 102 for connecting sleeve ground contact 65 to sleeve ground contact 69.

As mentioned previously, four of the rear connectors are MONITOR IN connectors 36c and four are MONITOR OUT connectors 36d. For performance monitoring purposes, resistors 122 are provided between the wire wrap pins 76 and the MONITOR rear connectors 36c and 36d. The resistors 122 provide signal resistance such that monitor level signals are output at the rear MONITOR connectors. In a preferred embodiment, the resistors 122 are adapted to provide an industry standard monitor level signal (e.g., approximately 20 dB for most applications). Of course, the decibel level of the monitor signal can vary depending upon the industry standard that is applicable. In one non-limiting embodiment, the resistors 122 each provide a resistance of about 523 ohms.

In use of the system, two signals (e.g., an IN signal and an OUT signal) can be routed through each jack insert 26. For example, referring to FIG. 11, the OUT signal can be input to the jack module 22 through an OUT connector 36b, routed through OUT jack 46 of the jack insert 26, and then output from the jack module 22 through the OUT wire wrap pins 32 of the cross-connect panel 30. The IN signal can be input to the jack module 22 through the IN wire wrap pins 32 of the cross-connect panel 30, routed through the IN jack 48 if the jack insert 26, and then output from the module 22 through an IN connector 36a. To interrupt the IN signal (e.g., for testing purposes), a tip-and-ring plug can be inserted in the IN port 48a causing the IN signal to be routed through the plug. To interrupt the OUT signal (e.g., for testing purposes), a tip-and-ring plug can be inserted in the OUT port 46a causing the OUT signal to be routed through the plug. The OUT and IN signals can be monitored without interruption by inserting tip-and-ring plugs into the respective MONITOR ports 47a, 49a.

The rear MONITOR IN connectors 36c and MONITOR OUT connectors 36d are used to provide semi-permanent test/monitoring access to the IN and OUT signal paths that normally pass through the jack insert 26. By coupling coaxial cables to the MONITOR connectors 36c, 36d, signals being transferred through the IN and OUT connectors 36a, 36b can be non-intrusively monitored. By accessing signals via both the MONITOR IN connectors 36c and the MONITOR IN jacks 49, or both the MONITOR OUT connectors 36d and the MONITOR OUT jacks 47, dual monitoring of the through-signals can be accomplished. Dual monitoring is particularly useful for performing different types of tests on a signal, or for test verification.

The depicted circuits have been labeled "IN" and "OUT" for designation/differentiation purposes only. The "IN" and "OUT" labels are not indicative of a direction of signal travel.

As used herein, the term co-axial cable connector includes connectors adapted for terminating co-axial cables. As shown in FIG. 6, co-axial cable connectors generally include a center conductor 300 and a shield contact 302 offset from the central conductor. Example co-axial cable connectors include BNC connectors, 1.6/5.6 connectors or SMB connectors, or other connectors.

In the depicted embodiment, the wire wrap pins 76 of the intermediate support 40 and the leads 88 are used to electrically connect the rear connectors 36 to the circuit board 42. It will be appreciated that the configurations for providing such electrical connections can be varied. For example, in certain embodiments, the rear connectors can be more directly connected to the circuit board 42 or coupled to a second circuit board, which is connected to the circuit board 42. In such embodiments, the intermediate support 40, the leads 88, or both, can be eliminated. Still other embodiments may or may not include circuit boards.

In the depicted embodiment, the jack inserts are removable from the front of the chassis. In alternative configurations, the jacks can comprise jacks mounted to the back side of an extended front panel (e.g., see U.S. Pat. No. 6,422,902, which is hereby incorporated by reference in its entirety). In the depicted embodiment, the jack inserts are mounted within a 4-pack module. In other embodiments, the number of jack inserts in a given module can be more or less than 4, or the separate modules can be eliminated such that the jack inserts are received directly in the chassis. In the depicted embodiment, each module carries the front mount 24 and the rear interface such that both the front mount 24 and the rear interface are removed from the chassis when the module is removed from the chassis. In other embodiments, the rear interface need not be modular and can include rear connectors that electrically connect to one or more back plane boards secured to the chassis. In still other embodiments, the rear interface can have a modular configuration with sets of the rear connectors mounted on separate rear supports that are removable from the back side of the chassis.

Having described preferred aspects and embodiments of the present invention, modifications and equivalents of the disclosed concepts may readily occur to one skilled in the art. However, it is intended that such modifications and equivalents be included within the scope of the claims which are appended hereto.

We claim:

1. A telecommunications apparatus comprising:
   a chassis sized to fit within a telecommunications rack, the chassis having a front side and a back side;
   a plurality of IN cross-connect connectors and a plurality of OUT cross-connect connectors;
   a plurality of IN jacks mounted in the chassis, the IN jacks including tip and ring springs and normal springs corresponding to the tip and ring springs;
   a plurality of OUT jacks mounted in the chassis, the OUT jacks including tip and ring springs and normal springs corresponding to the tip and ring springs;
   a plurality of IN co-axial cable connectors;
   a plurality of OUT co-axial cable connectors;
   IN signal paths that extend from the IN cross-connect connectors, through the IN jacks to the IN co-axial cable connectors;
   OUT signal paths that extend from the OUT cross-connect connectors, through the OUT jacks to the OUT co-axial cable connectors;
   MONITOR OUT co-axial cable connectors electrically connected to the OUT signal paths for providing monitor access to signals being transmitted through the OUT co-axial cable connectors; and
   MONITOR IN co-axial cable connectors electrically connected to the IN signal paths for providing monitor access to signals being transmitted through the IN co-axial cable connectors;
   wherein the OUT co-axial cable connectors, the IN co-axial cable connectors, the MONITOR IN co-axial cable connectors and the MONITOR OUT co-axial cable connectors are mounted on a plurality of rear connector mounts, each rear connector mount including a first side plate and a second side plate, the first and second side plates including rear end notches that provide clearance for preventing the OUT co-axial cable connectors, the IN co-axial cable connectors, the MONITOR IN co-axial cable connectors and the MONITOR OUT co-axial cable connectors from contacting the first and second side plates.

2. The telecommunications apparatus of claim 1, further comprising resistors for providing monitor level signals at the MONITOR OUT and MONITOR IN co-axial cable connectors.

3. The telecommunications apparatus of claim 1, wherein the IN cross-connect connectors, the OUT cross-connect connectors, the IN jacks and the OUT jacks are accessible from the front side of the chassis, and the OUT coaxial cable connectors, the IN co-axial cable connectors, the MONITOR IN co-axial cable connectors and the MONITOR OUT co-axial cable connectors are accessible from the back side of the chassis.

4. The telecommunications apparatus of claim 3, wherein the IN and OUT cross-connect connectors include wire wrap pins.

5. The telecommunications apparatus of claim 3, wherein the chassis has a height equal to or less than 10.5 inches.

6. The telecommunications apparatus of claim 3, wherein the OUT coaxial cable connectors, the IN co-axial cable connectors, the MONITOR IN co-axial cable connectors and the MONITOR OUT co-axial cable connectors are arranged in vertical rows, each of the rows having two OUT co-axial cable connectors, two IN co-axial cable connectors, two MONITOR IN co-axial cable connectors and two MONITOR OUT co-axial cable connectors.

7. The telecommunications apparatus of claim 6, wherein the chassis has a height equal to or less than 10.5 inches.

8. The telecommunications apparatus of claim 6, wherein the OUT co-axial cable connectors, the IN co-axial cable connectors, the MONITOR IN co-axial cable connectors and the MONITOR OUT co-axial cable connectors of each row are vertically staggered relative to the OUT co-axial cable connectors, the IN co-axial cable connectors, the MONITOR IN co-axial cable connectors and the MONITOR OUT co-axial cable connectors of adjacent rows.

9. The telecommunications apparatus of claim 1, further comprising IN and OUT MONITOR jacks for providing monitor access to the IN and OUT signal paths.

10. The telecommunications apparatus of claim 1, wherein the IN and OUT jacks are carried by jack inserts that are removable from the front side of the chassis.

11. The telecommunications apparatus of claim 10, wherein the jack inserts are mounted within a plurality of modular jack mounts that are removably mounted within the chassis.

12. The telecommunications apparatus of claim 10, wherein each modular jack mount is sized to hold four of the jack inserts.

13. The telecommunications apparatus of claim 1, wherein the OUT co-axial cable connectors, the IN co-axial cable connectors, the MONITOR IN co-axial cable connectors and the MONITOR OUT co-axial cable connectors are arranged in vertical rows and mounted on the plurality of rear connector mounts, each of the rows having two OUT co-axial cable connectors, two IN co-axial cable connectors, two MONITOR IN co-axial cable connectors and two MONITOR OUT co-axial cable connectors, each of the rear connector mounts supporting two of the vertical rows.

14. The telecommunications apparatus of claim 13, wherein each rear connector mount includes a housing including the first side plate, the second side plate, and a rear faceplate, the rows of co-axial cable connectors being mounted to the rear faceplate.

15. The telecommunications apparatus of claim 3, wherein the OUT co-axial cable connectors, the IN co-axial cable connectors, the MONITOR IN co-axial cable connectors and the MONITOR OUT co-axial cable connectors are arranged in vertical rows with each vertical row having at least 8 co-axial cable connectors.

16. A telecommunications apparatus comprising:
a chassis sized to fit within a telecommunications rack, the chassis having a front side and a back side;
a plurality of removable jack modules that mount within the chassis, each of the jack modules including:
a plurality of IN cross-connect connectors and a plurality of OUT cross-connect connectors;
a plurality of IN jacks including tip and ring springs and normal springs corresponding to the tip and ring springs;
a plurality of OUT jacks including tip and ring springs and normal springs corresponding to the tip and ring springs;
a plurality of IN co-axial cable connectors;
a plurality of OUT co-axial cable connectors;
IN signal paths that extend from the IN cross-connect connectors, through the IN jacks to the IN co-axial cable connectors;
OUT signal paths that extend from the OUT cross-connect connectors, through the OUT jacks to the OUT co-axial cable connectors;
MONITOR OUT co-axial cable connectors electrically connected to the OUT signal paths for providing monitor access to signals being transmitted though the OUT co-axial cable connectors;
MONITOR IN co-axial cable connectors electrically connected to the IN signal paths for providing monitor access to signals being transmitted though the IN co-axial cable connectors; and
a rear connector mount to which the OUT co-axial cable connectors, the IN co-axial cable connectors, the MONITOR IN co-axial cable connectors and the MONITOR OUT co-axial cable connectors are mounted, the rear connector mount including side plates having rear end notches that provide clearance for preventing the OUT co-axial cable connectors, the IN co-axial cable connectors, the MONITOR IN co-axial cable connectors and the MONITOR OUT co-axial cable connectors from contacting the side plates.

17. The telecommunications apparatus of claim 16, wherein each jack module includes four OUT co-axial cable connectors, four IN co-axial cable connectors, four MONITOR IN co-axial cable connectors and four MONITOR OUT co-axial cable connectors.

18. The telecommunications apparatus of claim 17, wherein each module defines a height less than or equal to about 10.5 inches, and each module defines a width less than or equal to 1.25 inches.

19. The telecommunications device of claim 17, wherein the four OUT co-axial cable connectors, the four IN co-axial cable connectors, the four MONITOR IN co-axial cable connectors and the four MONITOR OUT co-axial cable connectors are mounted to the rear connector mount in first and second vertical rows.

20. The telecommunications device of claim 19, wherein the co-axial cable connectors of the first row are vertically staggered relative to the co-axial cable connectors of the second row.

21. A jack module for occupying only a portion of a telecommunications chassis, the jack module comprising:
a front jack mount;
a plurality of IN cross-connect connectors and a plurality of OUT cross-connect connectors positioned below the front jack mount;
a plurality of jack inserts that mount within the front jack mount, each jack insert including an IN jack including tip and ring springs and normal springs corresponding to the tip and ring springs, each of the jack inserts also including an OUT jack including tip and ring springs and normal springs corresponding to the tip and ring springs;
a rear connector mount;
a plurality of IN co-axial cable connectors mounted to the rear connector mount;
a plurality of OUT co-axial cable connectors mounted to the rear connector mount;

IN signal paths that extend from the IN cross-connect connectors, through the IN jacks to the IN co-axial cable connectors;

OUT signal paths that extend from the OUT cross-connect connectors, through the OUT jacks to the OUT co-axial cable connectors;

MONITOR OUT co-axial cable connectors mounted to the rear connector mount and electrically connected to the OUT signal paths for providing monitor access to signals being transmitted though the OUT co-axial cable connectors; and MONITOR IN co-axial cable connectors mounted to the rear connector mount and electrically connected to the IN signal paths for providing monitor access to signals being transmitted though the IN co-axial cable connectors;

the rear connector mount including side plates having rear end notches that provide clearance for preventing the OUT co-axial cable connectors, the IN co-axial cable connectors, the MONITOR IN co-axial cable connectors and the MONITOR OUT co-axial cable connectors from contacting the side plates.

22. The jack module of claim 21, wherein the jack module includes four OUT co-axial cable connectors, four IN co-axial cable connectors, four MONITOR IN co-axial cable connectors and four MONITOR OUT co-axial cable connectors.

23. The jack module of claim 22, wherein the module defines a height less than or equal to 10.5 inches, and defines a width less than or equal to about 1.1 inches.

* * * * *